United States Patent [19]

Siarto

[11] 4,257,513

[45] * Mar. 24, 1981

[54] MACHINE TOOL

[75] Inventor: Andrew V. Siarto, West Bloomfield, Mich.

[73] Assignee: Siarto Machine and Tool Co., Inc., Novi, Mich.

[*] Notice: The portion of the term of this patent subsequent to Jun. 24, 1997, has been disclaimed.

[21] Appl. No.: 33,638

[22] Filed: Apr. 26, 1979

[51] Int. Cl.³ .............................................. B65G 17/00
[52] U.S. Cl. ..................... 198/345; 29/38 C
[58] Field of Search ................................ 198/345–346, 198/859, 803; 74/816–820, 813 R, 813 C, 813 L; 104/36, 46; 29/38 C; 414/750

[56] References Cited

U.S. PATENT DOCUMENTS

| 3,609,838 | 1/1971 | Wiest | 29/38 C |
| 4,065,991 | 1/1978 | Burgin | 104/46 X |

Primary Examiner—Robert B. Reeves
Assistant Examiner—Douglas D. Watts
Attorney, Agent, or Firm—Cullen, Sloman, Cantor, Grauer, Scott & Rutherford

[57] ABSTRACT

A machine tool has a support with a gear movable thereon and connected to a plurality of spaced workpiece supporting pallets with rollers movably mounted between a plurality of work stations upon a pair of rails, one rail having a cam surface. A plurality of abutments are mounted on the support at each work station and supportably engage a pallet when at such station, the pallet being anchored to the abutments for machining of a workpiece. The pallet is lifted off the rails when at a work station and solely supported by the abutments. As the pallet leaves a work station, on advancing of the gear, the cam rail lifts one side of the pallet upwardly to a transfer position above the abutments, with the other side of the pallet lowered for engagement with the other rail.

23 Claims, 7 Drawing Figures

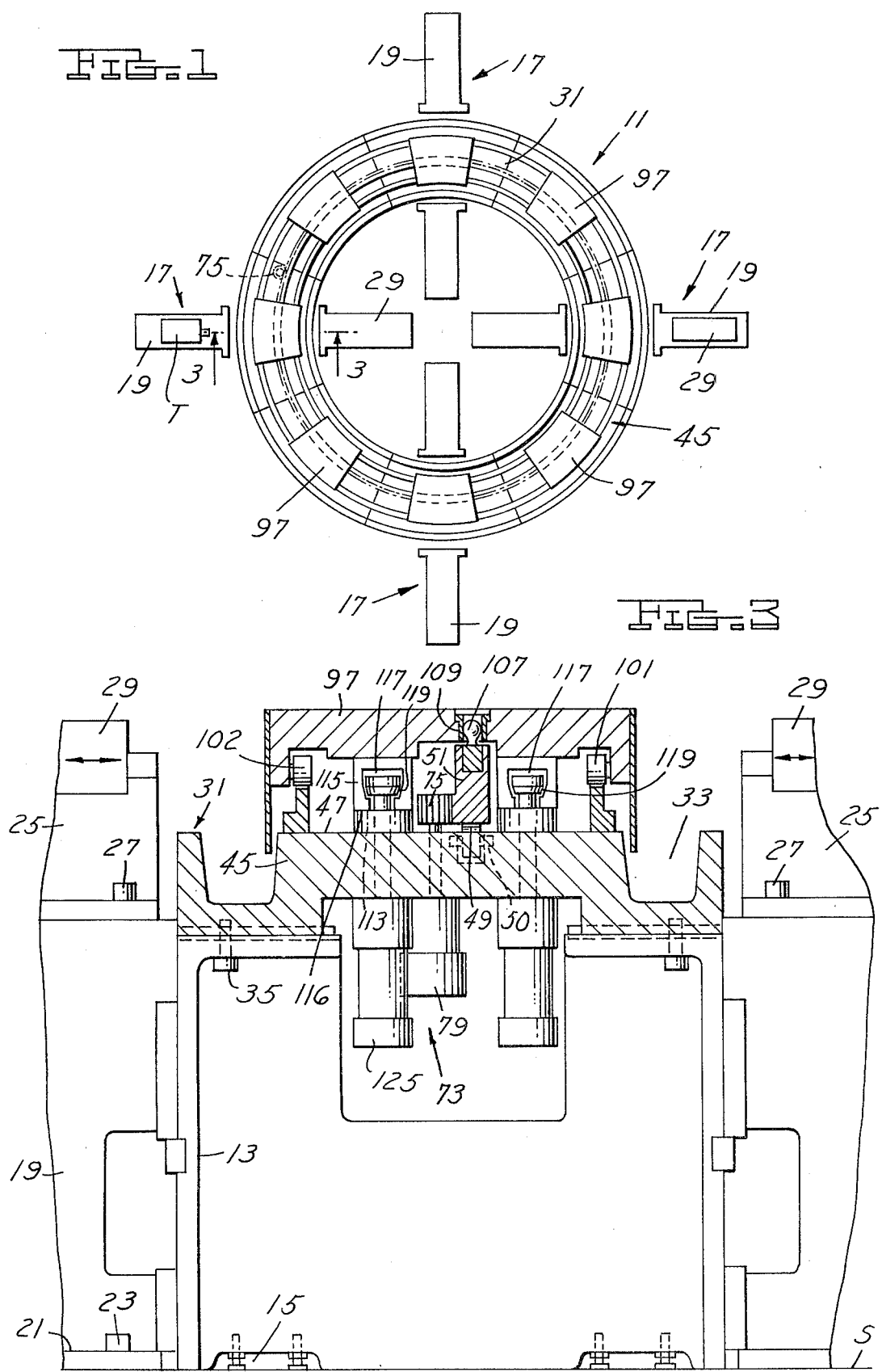

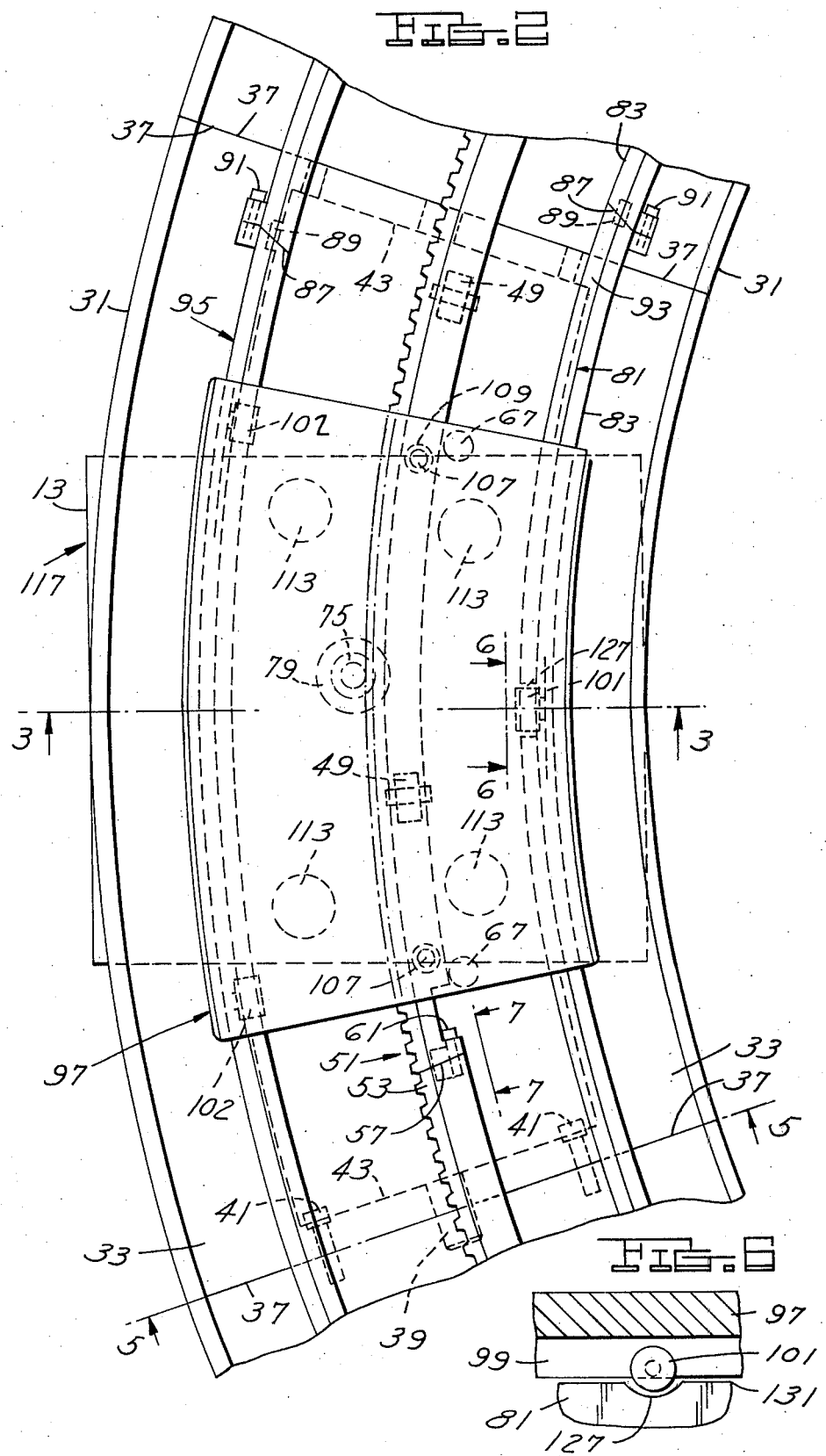

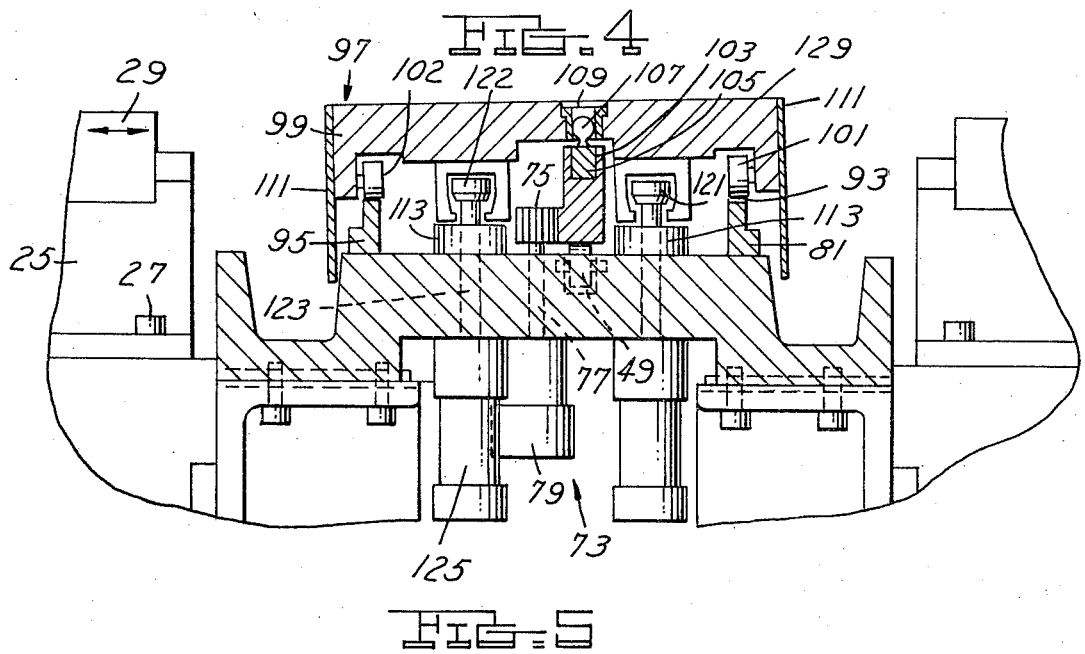
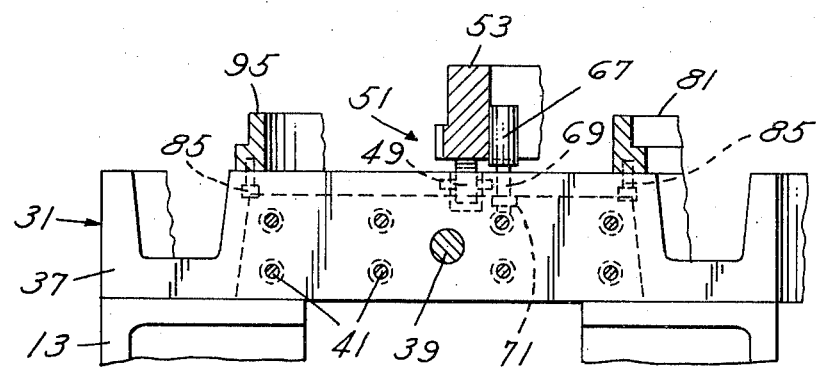
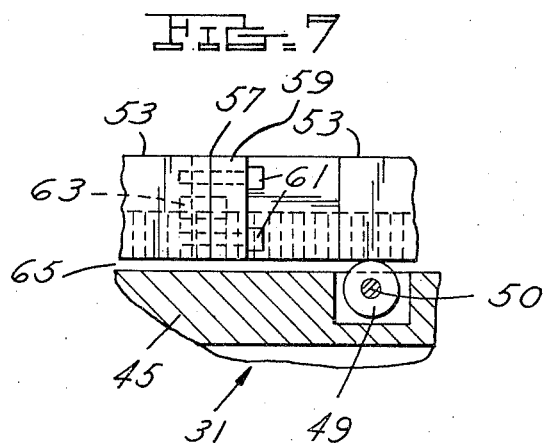

MACHINE TOOL

BACKGROUND OF THE INVENTION

The present invention constitutes an improvement over the machine tool disclosed in U.S. Pat. No. 3,609,838 to H. Wiest.

In the Wiest patent, a pallet is carried by a rotary gear into rough alignment with successive, peripherally spaced machining locations. The pallet is connected to the gear by means of a "spring pack," wherein a spring urges the pallet and the parts loaded on the pallet vertically upwardly into spaced relation above the gear. At the machining location, the gear is halted, and hydraulically actuated clamping devices pull the pallet downwardly relative to the gear and against the load of the spring pack to fix the pallet to a machine base in accurate alignment for machining.

The spring pack must exert substantial force upwardly to enable the pallet and its load of parts to float above the gear during transport. This spring force must be overcome by the clamping mechanism in order to pull the pallet downwardly into clamped position at each machine station prior to machining. The spring load has proven to be critical in use, and each individual machine tool must be fitted with specific spring packs depending upon the weight of the pallet, the weight and number of the parts to be machined, etc. Additionally, the necessity of overcoming the spring force with the clamping elements reduces the net clamping force securing the pallet in position during machining. It would be desirable from an economic and functional standpoint to eliminate the spring arrangement interposed between the pallet and the carrying gear.

The present invention is also an improvement over the machine tool disclosed in U.S. Pat. No. 4,130,920 issued to Siarto Machine and Tool Company, Inc., the assignee of the present application.

In the latter patent, the machine tool includes an annular gear which is rotatable in a horizontal plane and carries a plurality of pallets between adjacent peripherally arranged machine stations. Hydraulic power mechanisms are provided to raise the gear for transport between adjacent stations and to lower the gear for location at each station successively. The pallets are each carried by the gear and are hydraulically locked by the same hydraulic raising and lowering mechanism into finely adjusted position at each machine station by the use of precisely located telescopically interfitting elements on the gear support table and on the pallets respectively. A means was provided for accommodating final adjusting movement of the pallets relative to the gear at each station yet fixing the pallet relative to the gear during transport thereof.

Further examples in the prior art of machine tools of this type are found in the following U.S. Pat. Nos.: 3,336,823; 3,508,311; 3,479,712; 2,392,169; 2,967,440; and West German Pat. No. 2,531,559 dated July 15, 1975.

BRIEF SUMMARY OF THE INVENTION

The present machine tool represents an improvement over the prior art and includes an annular gear which overlies and is spaced from a support which mounts a series of spaced rollers for supporting the gear for rotation about a vertical axis. First and second annular rails are mounted upon the support surface on each side of the gear with the first rail having a cam surface. A pallet for supporting a workpiece and moveable through a plurality of work stations upon the support is interconnected with the gear for rotational movement. First and second rollers are carried by the underside of the pallet and are engageable with the rails. A plurality of abutments are mounted upon the support and are engageable with the pallet when at a work station as its sole support, the first and second rollers being spaced from the rails.

A clamping device is carried by the support and is engageable with the pallet for clamping the pallet to the abutments when at a work station. Indexing means rotate the gear moving the pallet between work stations. The cam rail in cooperation with a roller on the pallet lifts the pallet upwardly at one edge to a transfer position at the same time lowering the other rollers to engage the second rail at the same time lifting the pallet out of engagement with the abutments as the gear is advanced to move the pallet to a next work station.

The indexable gear has the primary function of intermittently advancing the respective pallets from station to station with a flexible connection such as a ball joint connection between the gear and the respective pallets to provide for limited relative vertical and horizontal movements therebetween. At work stations the pallet is solely supported upon the abutments and clamped thereto and independent and spaced from the rails, and when indexed forwardly of a work station one rail cams and elevates the pallet on one side slightly lowering the support rollers of the pallet upon the opposite side to supporting registry with the other rail at the same time disengaging the pallet from the abutments, which transfer tilted position of the pallet remains until the pallet arrives at the succeeding work stations respectively.

The machine tool support in the illustrative embodiment is circular and comprises a series of separable arcuate sectors whose radial ends are arranged end to end and secured together so that the sectors may be stored and shipped in sections and assembled at a point of use.

At each work station there is provided a sub-base upon a floor surface at each station which underlies and mounts the support with the adjacent support sector secured thereto and wherein the assembled support sectors as a unit span the respective sub-bases.

Although the rails could be straight and a gear could be straight, in the illustrative embodiment the gear and the rails are circular with each rail and gear comprising a series of arcuate sectors having angular engaging ends which are arranged end to end, aligned and secured together. The rails overlie the support sectors and are secured thereto spanning adjacent sectors and the pallet is adapted for intermittent movement over and upon the rails between work stations.

The sectors which comprise the rails and which span adjacent support sectors have their registering ends displaced and longitudinally staggered with respect to the registering ends of the support sectors as well as the registering ends of the gear sectors.

A wing base is mounted upon the floor surface radially upward of each sub-base at a work station as well as radially inward thereof as desired with each sub-base mounting a radially extending slide unit adapted to support a tool which is movable into operative registry with a workpiece anchored upon a pallet at each station.

In the illustrative embodiment each pallet mounts centrally thereof adjacent its opposite ends a pair of longitudinally spaced bushings which are adapted to loosely and cooperatively receive upwardly projecting spaced balls carried by the gear to provide in effect a loose connecting relationship between the gear and the respective pallets to accommodate respective horizontal and vertical movements between the two and particularly of the pallet with respect to the gear as it moves to a work station and as it moves from a work station to and through transfer positions.

When a pallet arrives at a work station the roller depending therefrom which moves along the cam rail loosely nests within the cam recess at said station so that the pallet tilts slightly about its longitudinal axis resting solely upon the abutments at the work station and at the same time the pair of rollers upon the opposite side of the pallet are lifted slightly above corresponding support rail. Thus during a machining operation at a work station the pallet is raised from the rails with its sole support being upon the abutments. However as the pallet advances from one work station toward the other succeeding station in a transfer movement the cam rail tilts the pallet upwardly on one side and drops the corresponding support rollers upon the opposite side of the pallet into supporting engagement with the second rail at the same time lifting the pallet off the abutments so that the sole support of the pallet is upon the rails during transfer movements.

These and other objects will be seen from the following specification and claims in conjunction with the appended drawings.

THE DRAWINGS

FIG. 1, is a schematic plan view of the present machine tool showing a support having a series of peripherally spaced work stations, and a plurality of spaced pallets movably mounted upon the support.

FIG. 2, is a fragmentary plan view of the support shown in FIG. 1 with a pallet movably mounted thereon, all on an increased scale.

FIG. 3, is a fragmentary vertical section thereof taken in the direction of arrows 3—3 of FIG. 2.

FIG. 4, is a fragmentary section similar to FIG. 3 showing the transfer position of the pallet on forward advance from a work station.

FIG. 5, is a fragmentary vertical section taken in the direction of arrows 5—5 of FIG. 2.

FIG. 6, is a fragmentary vertical section taken in the direction of arrows 6—6 of FIG. 2 and illustrating a roller receiving cam recess.

FIG. 7, is a fragmentary section taken in the direction of arrows 7—7 of FIG. 2.

It will be understood that the above drawings illustrate a preferred embodiment of the invention, and that other embodiments are contemplated within the scope of the claims hereafter set forth.

DETAILED DESCRIPTION OF ONE EMBODIMENT OF THE INVENTION

Referring to the drawings the present machine tool is generally indicated at 11 in FIG. 1 and includes a series of peripherally spaced sub-bases 13 fragmentarily shown in FIGS. 2 and 3 as mounted upon a floor surface S and including a series of conventional leveling screws 15.

A series of circumferentially spaced work stations are designated at 17 FIG. 1 spaced around the support 45.

Wing bases 19 are mounted upon the floor surface and arranged radially outward and inwardly of each sub-base, and whose anchor flanges 21 are secured to the floor surfaces as by fasteners 23. The wing bases 19 are further secured to the adjacent sub-base by a plurality of fasteners, not shown.

Mounted upon each wing base is a radially extending slide unit 25 having a slide 29 adapted to support a suitable tool T for radial inward and outward movements relative to a workpiece secured upon the respective pallet at a work station.

Support 45 is circular and has an upper support surface 47 and is made up of a series of arcuate support sectors 31, each extending over an arc of 45° for example.

Each support sector includes a radial end face 37 at its opposite ends with the end faces arranged end to end in a circle and with the respective sectors secured together by a series of fasteners 41 and associated dowels 39 extending through and between adjacent assembly flanges 43 in the respective sectors.

The assembled sectors as interconnected and secured together are furthermore anchored to respective sub-bases 13 by a series of fasteners 35 as shown in FIG. 3. Since the support sectors which make up the circular support are in units they may be stored and shipped in sections and assembled at a point of use upon a suitable floor surface S such as shown in FIG. 3.

Within each of the sectors defining the support 45 there are a pair of outer elongated channels 33 which define continuous troughs around the central circular support 45.

Journaled within corresponding recesses within support 45 adjacent the support surface 47 are a series of longitudinally spaced rollers 49 on horizontal axles 50. These rollers underlie and supportably engage the annular gear 51 which is made up of a series of annular gear segments 53. The registering ends of the gear sectors are tapered as at 57, FIG. 2, and arranged end to end. A plurality of fasteners 61 extend through flange 59, FIG. 1, of one gear sector and extend into the tapered end face of the other gear sector with one or more dowels 63 interposed. This completes the assembly and securing together of the series of gear sectors of arcuate form which when arranged end to end form a circle and overlie the respective support sectors 31 upon the upper support surfaces 47 and rest upon the series of longitudinally spaced rollers 49.

The registering ends of a pair of gear sectors overlie one support sector and at least one of their ends spans a pair of adjacent support sectors as best shown in FIG. 2. Rollers 49 within support 45, as in FIG. 7, support the assembled gear above support surface 47 by a limited spacing shown at 65. Accordingly, the arcuate ring gear 51 is movably mounted upon the support 45 and rests upon the series of rollers 49.

The support 45 for the machine tool thus consists of a series of interconnected support sectors 31 which overlie and span the respective sub-bases 13.

A series of spaced upright backup rollers 67 are each journaled upon support shaft 69 secured at 71, FIG. 65, on support 45 and supportably engage gear 51 upon one side thereof and serving to further guide longitudinal movements of the gear as advanced upon its support rollers 49.

Indexing means 73, FIGS. 3 and 4, are carried by the support 45 for rotating the gear 51 for advancing it over said support upon its rollers 49 and for transfering the pallets 97 to and between work stations 17 as hereafter described in detail.

The indexing means 73 includes a motor 79 carried upon the underside of the support 45 and including a drive shaft 77 mounting a pinion 75 in mesh with gear 51. Any suitable power train may be employed between the motor and gear. In the present instance the power train includes pinion 75 on motor shaft 77, and in mesh with gear 51.

As shown in FIGS. 1, 2, 3 and 4 a feet first annular rail 81, consisting of a series of arcuate rail segments 83, is secured upon support 45 by a plurality of fasteners 85, FIG. 5. The ends of the individual rail segments have tapered ends 87, FIG. 2, are arranged end to end, aligned by dowels 89 and secured together by fasteners 91 as shown in FIG. 2. First rail 81 has a top cam surface 93 thereon having a rise of 0.020 inches approximately. The first annular rail 81 is arranged upon one side of gear 51. The second annular rail 95 is mounted upon support 45 upon the opposite side of the gear 51 and secured thereto by the fasteners 85, FIG. 5. The second annular rail is otherwise of the same construction as the first annular rail 81 and consists of a series of arcuate rail segments 83 which have tapered end portions 87 the same as shown in FIG. 2 which are aligned by dowels 89 and secured together by fasteners 91.

Essentially, in the illustrative embodiment, the respective rails 81 and 95 are parallel and circular extending throughout 360° upon the support 45. A plurality of pallets 97, of general arcuate form, are adapted to supportably secure a workpiece which is to be transported between the work stations 17 and has adjacent its opposite sides the depending flanges 99. Each of these flanges support rollers which are movably mounted upon the respective rails 81 and 95 as illustrated in FIGS. 3 and 4. The effective height of rail 95 is less than the height of rail 81, up to 0.02 inches, approximately.

In the illustrative embodiment the roller 101, sometimes referred to as first roller means, is journaled upon a transverse horizontal axis upon pallet flange 99 and are arranged intermediate the ends of the pallet on one side thereof as shown in FIG. 2. Upon the undersurface of the pallet upon its opposite side and inwardly of the corresponding flange 99 are a pair of rollers 102, sometimes referred to as second roller means which are journaled upon the undersurface of the pallet and supportedly engage rail 95 as in FIG. 3.

Since the pallets are moved along the rails by the corresponding feed movements of the gear 51, there is provided between the gear and the respective pallets shown in FIGS. 1 and 2 a suitable flexible connection whereby the gear is capable of effecting longitudinal indexing movements of the pallet from station to station upon the support and at the same time the pallet is adapted for relative vertical and horizontal movement with respect to the gear.

In the illustrative embodiment this is accomplished by a series of ball mounts 105, FIG. 4, which are nested down into the top surface of a gear segment 53 to support the ball 107 which projects above the gear.

In the illustrative embodiment the spacing of the balls is such that a pair of the balls cooperatively projects up into a pair of longitudinally spaced centrally arranged bushings 109 which extend through the pallet adjacent its ends. Thus there is in effect a loose or swivel connection of the gear and associated balls 107 with respect to the pallets so that the gear is capable of effecting longitudinal arcuate advance or indexing movements of the pallet over the rails but with the pallet adapted for limited tilting movements with respect to the gear as hereafter described.

The pallet 97 has along its opposite sides the depending skirts 111 which extend down into the troughs 33 for the primary purpose of excluding dirt and dust from the interior portions of the pallet and the rollers and other mechanism therein.

At each of the work stations 17 there is provided a plurality of laterally spaced abutments 113 which are mounted upon the support surface 47 and suitably secured thereto. Said abutments sometimes are referred to as clamp pads. These abutments are engageable with a pallet when at a work station whereby the pallet is supported solely by the abutments and clamped thereon for machining operations at each work station as desired. A series of clamping mechanisms are furthermore carried by support 45 and are engageable with the pallet for clamping the pallet to the abutments when at a work station.

The engagement of the pallet with the respective abutments includes a plurality of spaced pairs of laterally spaced clamp projection feet 115, FIG. 3, which are secured to and depend from the undersurface of each pallet and which have abutment surfaces 116 at their lower ends adapted for cooperative registry with the abutments 113.

The respective clamp projection feet are spaced apart as at 117, FIG. 3, and at their lower ends terminate in the inwardly tapered locating surfaces 119.

The clamping mechanism includes a corresponding series of laterally spaced locators 121, sometimes referred to as locator heads, which are secured upon the upper ends of the piston rods 123 which extend through the support 45. Corresponding hydraulic cylinders 125 underlie support 45 in alignment with the abutments 113 and are suitably secured to the support. In the normal unretracted position of the locators 121 they are so positioned at the work stations that as the pallet advances into registry with the work station they are received within the corresponding slots 117 between the adjacent clamp projection feet 115 as shown in FIGS. 3 and 4.

When a pallet is at the work station the cylinders 125 are activated to retract the corresponding rod 123 drawing the locator heads 121 downwardly so that their corresponding lower annular tapered locating surfaces 122 are in frictional securing registry with the corresponding tapered locating surfaces 119 at the lower ends of the clamp projection feet, FIG. 4.

At the time that the pallet is in correct registry at a particular work station 117 upon support 45 roller 101 of the pallet is in registry with cam recess 127, FIG. 7. Thus the corresponding side of the pallet is lowered a slight distance so that the abutment surfaces 116 of the clamp projection feet 115 are supportably engaged upon the abutments 113. This slight dropping of the pallet roller 101 partly down into the cam recess 127 at the same time effects a slight lifting of the rollers 102 upon the opposite side of the pallet lifting them a short distance from the corresponding rail 95.

Accordingly the clearance of the rollers 101 and 102 with respect to the rails 81 and 95 is a limited distance of 0.003 to 0.004 inches approximately.

The spacing is just sufficient so that the pallet while clamped at a work station is solely supported only upon the abutments 113 and clamped thereto and with the corresponding pallet support rollers 101 and 102 spaced above the adjacent rails.

After a machining operation of a workpiece upon a respective pallet at a work station as soon as the indexing motor 79 is energized there will be an initial advancing of the gear 51. Successively the first pallet support roller 101 will operatively engage the cam surface 93 of the adjacent cam rail 81 and will tilt the pallet upwardly to the position shown in FIG. 4 a short distance of approximately 0.020 inches corresponding to the cam rise of rail 81. This is referred to as a transfer position 129 designated in FIG. 4 and wherein the pallet has been tilted upwardly from its right side. At the same time this upward tilting movement of the pallet with respect to rail 81 causes the support rollers 102 upon the opposite sides of the pallet to move downwardly a slight distance into operative supporting engagement with the second rail 95. Here the abutment surfaces 116 of the pallet clamp projection feet 115 have been lifted above the abutments 113 a short distance. Accordingly the pallet in its slightly tilted transfer position is supported solely upon the rails 81 and 95 and moves independently of the abutments 113 at each of the work stations.

The positioning of the pallet with respect to a work station is further shown in FIG. 2 with the roller 111 for the pallet nested down into the cam recess 127 and with the result that while the pallet is clamped at the work station the undersurface of the pallet flange 99 is spaced from the rail 81 a limited distance designated at 131, FIG. 6. The spacing upon the opposite side of the pallet of the rollers 102 with respect to the rail 95 is approximately the same, namely 0.003 to 0.004 inches.

As a modification of the present invention it is contemplated that upon a suitable support surface which could be straight rather than circular there could be provided an elongated gear which is straight rather than arcuate and which would be similarly mounted upon said support surface by the corresponding rollers 49. The additional spaced backup rolls 67 would be mounted upon the support surfaces so as to supportably engage one side of the ring gear.

Accordingly the respective pallets would be adapted for moving longitudinally upon a support surface in the same manner as above described with the pallet supported upon corresponding rails 81 and 95 with suitable rollers 101 and 102 interposed and where a similar clamping arrangement is provided for securing the pallet at the respective work stations and wherein at the work stations the pallet is solely supported upon the abutments 113 and clamped thereto in the same manner as above described.

I claim:

1. In a machine tool, a support having an upper support surface;
   an annular gear overlying and being spaced from said support surface;
   a plurality of rollers carried by said support and engaging the undersurface of said gear to support the gear for rotation about a vertical axis;
   first and second annular rails on said support surface, one rail on each side of said gear;
   said first rail having a cam surface;
   a pallet for supporting a workpiece and movable through a pluraltiy of work stations;
   means interconnecting said pallet to said gear for rotational movement, yet accommodating limit relative vertical and horizontal movement therebetween;
   first roller means carried by the underside of said pallet and engageable with said first rail;
   second roller means carried by the underside of said pallet and engageable with said second rail;
   a plurality of abutments carried by said support and engageable with said pallet when at a work station whereby said pallet is supported solely by said abutments and not by said gear, with said first and second roller means being spaced from said rails a small vertical distance;
   clamping means carried by said support engageable with said pallet for clamping the pallet to said abutments when at a work station;
   indexing means on said support for rotating said gear and thereby moving said pallet between work stations, whereby said first rail cams said first roller means upwardly thereby lifting the corresponding edge of said pallet to a transfer position and lowering said second roller means to engage said second rail, and said pallet being lifted out of engagement with said abutments, resulting in the pallet and its workpiece carried by said rails and not by said gear, as said gear is rotated to move said pallet to the next work station.

2. In the machine tool of claim 1, said support being circular and comprising a series of separable arcuate sectors with radial ends;
   said sectors being arranged end to end; and a plurality of fasteners interconnecting the ends of adjacent support sectors, whereby the tool may be stored and shipped in sections and assembled at point of use.

3. In the machine tool of claim 2, aligning dowels interconnecting said sector ends.

4. In the machine tool of claim 2, there being a series of spaced work stations located around said support; and a sub-base mounted upon a floor surface at each station underlying and mounting said support and secured to an adjacent support sector, said assembled support sectors as a unit spanning said sub-bases.

5. In the machine tool of claim 2, said gear and rails being circular, each rail and gear comprising a series of arcuate sectors, with angular engaging ends, and arranged end to end respectively;
   and combination dowels and fasteners aligning and interconnecting said registering ends;
   said rails overlying said support sectors and secured thereto, said pallet adapted for intermittent movement upon said rails to and between said work stations.

6. In the machine tool of claim 5, the sectors comprising said rails spanning adjacent support sectors with their registering ends displaced and longitudinally staggered with respect to the registering ends of said support sectors.

7. In the machine tool of claim 6, the sectors comprising said gear spanning adjacent support sections with the registering ends longitudinally staggered with respect to the registering ends of said support section and rails respectively.

8. In the machine tool of claim 1, a series of spaced upright backup rolls journaled upon said support radially inward of and guidably engaging said annular gear.

9. In the machine tool of claim 4, a wing base upon said floor surface radially outward of each sub-base at said work stations; and a radially extending slide unit upon each wing base adapted to support a tool movable into operative registry with a workpiece anchored upon a pallet at each station.

10. In the machine tool of claim 9, additional wing bases upon said floor surface radially inward of each sub-base at said work stations, and a radially extending slide unit upon each additional wing base adapted to support a tool movable into operative registry with a workpiece anchored upon said pallet at each station.

11. In the machine tool of claim 1, the means interconnecting said pallet and gear including a ball above and mounted upon said gear, and a bushing extending through said pallet centrally thereof cooperatively receiving said ball.

12. In the machine tool of claim 11, there being a plurality of spaced balls upon said gear, there being a pair of longitudinally spaced bushings upon said pallet centrally thereof cooperatively receiving said balls respectively.

13. In the machine tool of claim 12, there being a plurality of spaced pallets movably mounted upon said rails; each pallet mounting a pair of spaced bushings centrally thereof, said balls extending around said gear with pairs of said balls extending into corresponding bushings of all of said pallets, whereby said pallets are adapted for movement 360 degrees to and between said work stations.

14. In the machine tool of claim 1, said first roller means including a single roller intermediate the ends of said pallet;
said second roller means including a pair of longitudinally spaced rollers adjacent the ends of said pallet.

15. In the machine tool of claim 1, the engagement of said pallet with said abutments comprising a plurality of spaced pairs of laterally spaced clamp projection feet, depending from said pallet, each pair of feet having an abutment surface adapted for registry with an abutment respectively;
said clamping means including a reciprocal locator normally nested loosely between each pair of feet when said pallet is at a work station;
and a cylinder assembly aligned with each abutment underlying and secured to said support and including a reciprocal piston rod extending through said abutment and mounting said locator;
retraction of said locators operatively drawing said feet into securing engagement with said abutments.

16. In the machine tool of claim 15, the opposed interior surfaces of said feet at their lower ends being tapered inwardly; the undersurface of said locators being tapered and adapted for cooperative retaining engagement with said tapered surfaces, said tapered surfaces shifting the pallet transversely for accurate registry with said support surface and into machining position.

17. In the machine tool of claim 16, said locators being circular, and their tapered surfaces being annular.

18. In the machine tool of claim 1, said spacing of said roller means from said rails including a cam recess formed in said first rail at said work stations, vertically spaced from the loosely receiving said first roller means downward movement of said first roller means into said cam recess lifting said second roller means above said second rail.

19. In the machine tool of claim 1, said indexing means including a motor secured to said support and having an output shaft; and a drive train interconnecting said shaft and gear.

20. In the machine tool of claim 19, said drive train including a pinion on said shaft in mesh with said gear.

21. In the machine tool of claim 18, said spacing being in the range of 0.003 to 0.004 inches approximately.

22. In the machine tool of claim 1, the rise in said cam surfaces and the corresponding lift of said pallet relative to said abutments being 0.020 inches approximately.

23. In a machine tool, a support having an upper support surface;
an elongated gear overlying and being spaced from said support surface;
a plurality of rollers carried by said support and engaging the undersurface of said gear to support the gear for longitudinal movement;
first and second parallel rails on said support surface, one rail on each side of said gear;
said first rail having a cam surface;
a pallet for supporting a workpiece and movable through a plurality of work stations;
means interconnecting said pallet to said gear for longitudinal movement, yet accommodating limited relative vertical and horizontal movement therebetween;
first roller means carried by the underside of said pallet and engageable with said first rail;
second roller means carried by the underside of said pallet and engageable with said second rail;
a plurality of abutments carried by said support and engageable with said pallet when at a work station whereby said pallet is supported solely by said abutments and not by said gear, with said first and second roller means being spaced from said rails a small vertical distance;
clamping means carried by said support engageable with said pallet for clamping the pallet to said abutments when at a work station;
indexing means on said support for advancing said gear and thereby moving said pallet between work stations, whereby said first rail cams said first roller means upwardly thereby lifting the corresponding edge of said pallet to a transfer position, said second roller means engaging said second rail, and said pallet being lifted out of engagement with said abutments, resulting in the pallet and its workpiece being carried by said rails and not by said gear, as said gear is advanced to move said pallet to the next work station.

* * * * *